(12) United States Patent
Reinold

(10) Patent No.: US 6,411,527 B1
(45) Date of Patent: Jun. 25, 2002

(54) HIGH-VOLTAGE DC/DC CONVERTER

(75) Inventor: Harry Reinold, Landau (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 09/927,553

(22) Filed: Aug. 9, 2001

(30) Foreign Application Priority Data

Aug. 9, 2000 (DE) .......................................... 100 38 814

(51) Int. Cl.$^7$ ............................................. H02M 3/335
(52) U.S. Cl. .............................. 363/17; 363/71; 363/69; 363/35
(58) Field of Search ............................. 363/71, 69, 17, 363/16, 35, 37

(56) References Cited

U.S. PATENT DOCUMENTS 5,576,940 A * 11/1996 Steigerwald et al. .......... 363/17

* cited by examiner

*Primary Examiner*—Shawn Riley
(74) *Attorney, Agent, or Firm*—Laurence A. Greenberg; Werner H. Stemer; Gregory L. Mayback

(57) ABSTRACT

A high-voltage DC/DC converter is described. The high-voltage DC/DC converter contains a number of primary-side converter modules and at least one secondary-side converter module. The DC connections of the primary-side converter modules are connected in series between the connections of a high-voltage DC distribution network. The DC connections of the secondary-side converter modules are connected in parallel between the connections of a further DC network. Each of the primary-side converter modules contains a primary-side converter bridge, a primary-side capacitor, a primary-side series resonant capacitor, a transformer and a secondary-side series resonant capacitor. The secondary-side converter module contains a secondary-side converter bridge and a secondary-side capacitor.

4 Claims, 3 Drawing Sheets

HIGH-VOLTAGE DC/DC CONVERTER

BACKGROUND OF THE INVENTION

Field of the Invention

The invention relates to a high-voltage DC/DC converter, and is preferably used in the field of high-voltage DC transmission (HVDCT).

A high-voltage DC distribution network with a feeder or feeders and a branch or branches are used in connection with high-voltage DC/DC converters. The two ends of the high-voltage DC distribution network are connected to a first converter and to a second converter respectively, with respective energy-storage capacitors, with an earthed center point, being provided in each case. The two converters respectively, have connections, respectively, on the other side for three-phase networks. The first converter is preferably used as a feeder rectifier, and for this purpose is connected to a power station. The second converter preferably operates as an inverter, for feeding into a branching supply network.

The high-voltage DC distribution network is furthermore connected to a third converter and to the high-voltage DC/DC converter. The third converter is provided on the other side with connections for a preferably low-voltage three-phase network, and may operate either as an inverter for feeding from the distribution network into the three-phase network, or as an inverter for feeding from the three-phase network into the high-voltage DC distribution network.

The high-voltage DC/DC converter is connected via connections to the distribution network, and has connections for a further preferably low-voltage (medium-voltage) DC network. First, it is possible to use the high-voltage DC/DC converter for feeding the DC network (for example a medium-voltage DC distribution network) from the high-voltage DC distribution network. Second, it is possible to use the high-voltage DC/DC converter for feeding the high-voltage DC distribution network from the DC network. In the latter case, the high-voltage DC/DC converter is connected, for example, to a solar power station or to a wind-driven power station.

SUMMARY OF THE INVENTION

It is accordingly an object of the invention to provide a high-voltage DC/DC converter which overcomes the above-mentioned disadvantages of the prior art devices of this general type, which can be produced cost-effectively for various primary-side and secondary-side voltage requirements.

With the foregoing and other objects in view there is provided, in accordance with the invention, a high-voltage DC/DC converter. The high-voltage DC/DC converter has a number of primary-side converter modules having DC connections. The DC connections of the primary-side converter modules are connected in series between connections of a high-voltage DC distribution network. Each of the primary-side converter modules have a primary-side converter bridge, a primary-side capacitor connected to the primary-side converter bridge, a primary-side series resonant capacitor connected to the primary-side converter bridge, a transformer connected to the primary-side series resonant capacitor and to the primary-side converter bridge, and a secondary-side series resonant capacitor connected to the transformer. At least one secondary-side converter module having DC connections is provided. The DC connections of the secondary-side converter modules are connected in parallel between connections of a further DC network. The secondary-side converter module have a secondary-side converter bridge and a secondary-side capacitor connected to the secondary-side converter bridge.

The advantages that can be achieved by the invention are, in particular, that the proposed module concept allows the high-voltage DC/DC converter to be matched to the specified voltage of the high-voltage DC distribution network in a very simple and universal manner. That is to say the number of converter modules that need to be connected in series is governed by the voltage of the high-voltage DC distribution network. All that is required is to configure, manufacture and stock a very small number (for example three) of different types of converter modules (with different current, voltage and rating data) in order to allow all the conceivable variations in the field of high-voltage DC supply technology and branching technology to be covered.

Since the converter modules are produced in relatively large quantities, this results in cost advantages in comparison to a solution approach without using modules. The time penalty required to implement a project is considerably reduced, and spares stockholdings are simplified.

Advantageously, there is no need for any synchronized drive for a series circuit containing a large number of active semiconductor devices disposed between the high-voltage connections.

In accordance with an added feature of the invention, both the primary-side converter bridge and the secondary-side converter bridge have semiconductor switches which can be switched on and off actively.

In accordance with an additional feature of the invention, the primary-side converter bridge has a semiconductor switch which can be switched on and off actively, and the secondary-side converter bridge is formed of diodes.

In accordance with a further feature of the invention, the primary-side converter bridge is formed of diodes, and the secondary-side converter bridge includes semiconductor switches which can be switched on and off actively.

Other features which are considered as characteristic for the invention are set forth in the appended claims.

Although the invention is illustrated and described herein as embodied in a high-voltage DC/DC converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 5:
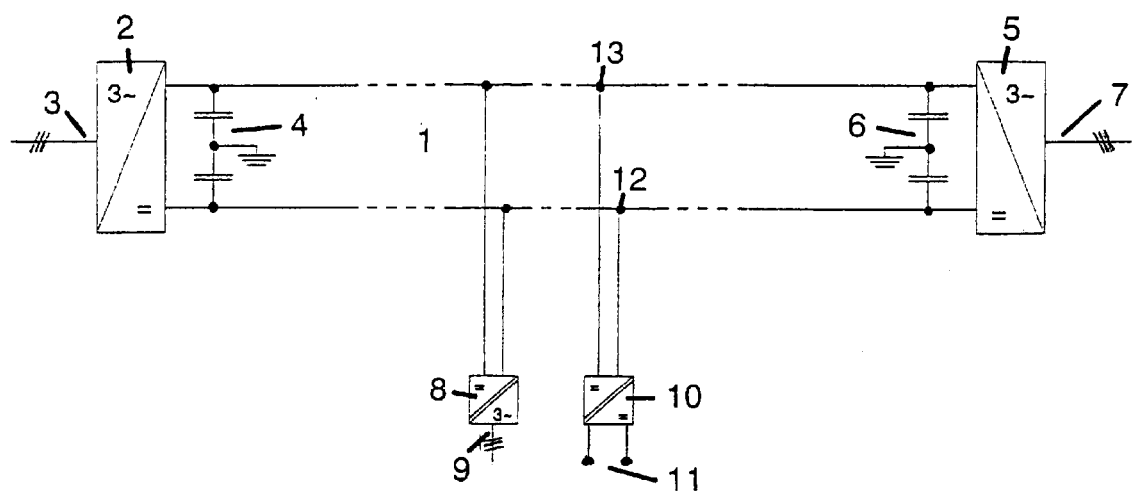
FIG. 5 is a schematic diagram of a high-voltage DC distribution network with a feeder or feeders and a branch or branches.

In all the figures of the drawing, sub-features and integral parts that correspond to one another bear the same reference symbol in each case. Referring now to the figures of the drawing in detail and first, particularly, to FIG. 5 thereof, there is shown a high-voltage DC distribution network with a feeder or feeders and a branch (tap) or branches. The two ends of the high-voltage DC distribution network 1 are connected to a converter 2 and to a converter 5, respectively, with respective energy-storage capacitors 4 and 6, with an earthed center point, being provided in each case. The two converters 2 and 5, respectively, have connections 3 and 7, respectively, on the other side for three-phase networks. The converter 2 is preferably used as a feeder rectifier, and for this purpose is connected to a power station. The converter 5 preferably operates as an inverter, for feeding into a branching supply network.

The high-voltage DC distribution network 1 is furthermore connected to a converter 8 and to a high-voltage DC/DC converter 10. The converter 8 is provided on the other side with connections 9 for a preferably low-voltage three-phase network, and may operate either as an inverter for feeding from the distribution network 1 into the three-phase network, or as an inverter for feeding from the three-phase network into the high-voltage DC distribution network 1.

The high-voltage DC/DC converter 10 is connected via connections 12, 13 to the distribution network 1, and has connections 11 for a further preferably low-voltage (medium-voltage) DC network. First, it is possible to use the high-voltage DC/DC converter 10 for feeding the DC network (for example a medium-voltage DC distribution network) from the high-voltage DC distribution network 1. Second, it is possible to use the high-voltage DC/DC converter 10 for feeding the high-voltage DC distribution network 1 from the DC network. In the latter case, the high-voltage DC/DC converter is connected, for example, to a solar power station or to a wind-driven power station.

Figure 1:
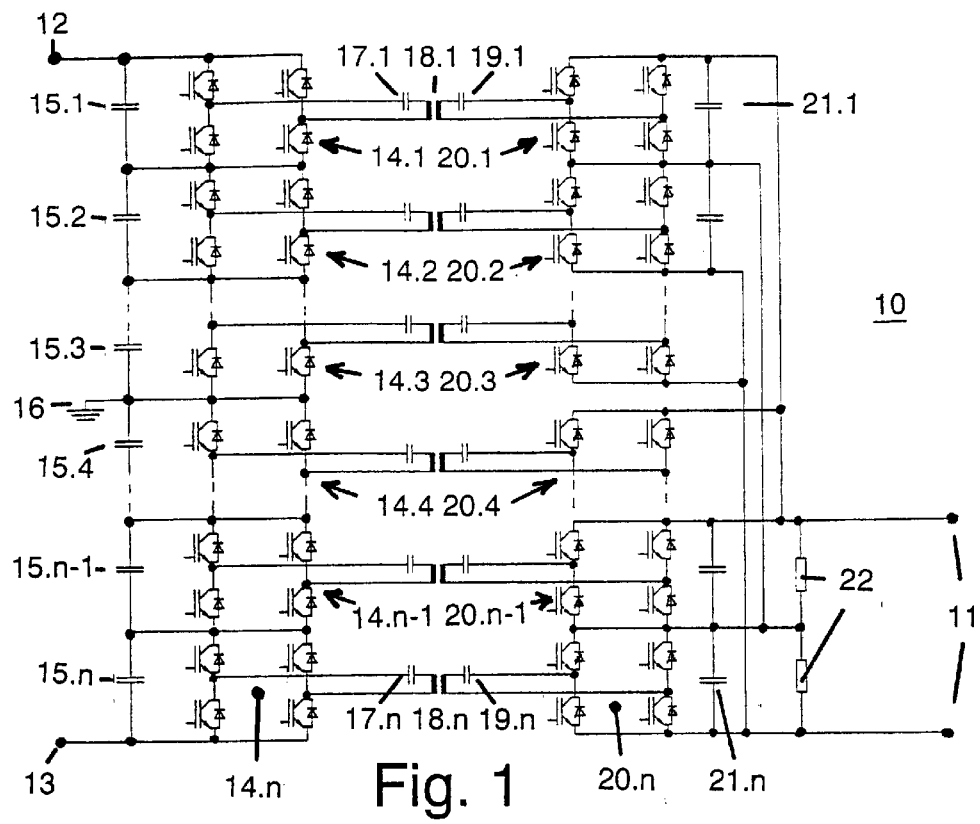
FIG. 1 is a schematic diagram of a basic version of a high-voltage DC/DC converter according to the invention.

FIG. 1 shows a basic version of the high-voltage DC/DC converter 10. One important feature is the DC isolation between the connections 12, 13 to the high-voltage DC distribution network 1 on the one side, and the medium-voltage-side connections 11 (for example 5 kV voltage between the connections 11) on the other side. The DC isolation is provided by n transformers 18.1 to 18.n. Primary coils of the transformers 18.1 to 18.n are connected to AC connections of converter bridges 14.1 to 14.n, with the connections being made via series resonant capacitors 17.1 to 17.n. DC connections of the converter bridges 14.1 to 14.n are connected in series between the connections 12, 13, with a capacitor 15.1 to 15.n in each case being disposed between the DC connections. This results in a series capacitor circuit between two high-voltage-side connections 12, 13 (for example 70 kV voltage between the connections 12, 13). A center point of the series capacitor circuit is connected to earth via an earth connection 16.

The secondary coils of the transformers 18.1 to 18.n are connected to AC connections of converter bridges 20.1 to 20.n, with the connections being made via series resonant capacitors 19.1 to 19.n. Two converter bridges 20.1 to 20.n are in each case connected in series in pairs via their DC connections, with a capacitance 21.1 to 21.n in each case being disposed between the DC connections. The pairs formed in this way are connected via their outer DC connections and parallel to the connections 11. The center connections of the pairs are connected to one another. A common junction point of all the center connections of the pairs is connected to the connections 11 via resistors 22.

In the basic version of the high-voltage DC/DC converter 10 shown in FIG. 1, both the converter bridges 14.1 to 14.n and the converter bridges 20.1 to 20.n are each fitted with semiconductor switches which can be switched on and off actively, such as IGBTs, GTOs, MOSFETs, in the four bridge arms. This allows optimum control/regulation of the energy flow or current flow both from the high-voltage DC distribution network 1 to the medium-voltage-side connections 11 and, in the opposite direction, from the connections 11 to the high-voltage DC distribution network 1. The semiconductor switches which can be switched on and off actively are preferably operated at a relatively high switching frequency in the range 2 to 10 kHz, which advantageously reduces the physical size of the transformers in comparison to operation at a low frequency. A combination of zero current switching (ZCS) and zero voltage switching (ZVS) is advantageously used for operation.

As can be seen from FIG. 1, the high-voltage DC/DC converter 10 is composed of n converter modules that are each in the form of, and operated as, series-resonant DC/DC converters. A converter module such as this generally contains the primary-side converter bridge 14.n, a primary-side capacitor 15.n, a primary-side series resonant capacitor 17.n, a transformer 18.n, a secondary-side converter bridge 20.n, a secondary-side capacitor 21.n and a secondary-side series resonant capacitor 19.n. Depending on the semiconductor switches used in the converter bridges, a converter module is suitable for having a specific maximum voltage (module voltage)—for example of 2.5 kV—applied to it.

One advantageous feature is that a transformer may be insulated only for the module voltage, that is to say for example for 2.5 kV. The transformation ratio between the primary and secondary windings is preferably approximately 1:1. The transformer can be very compact with little stray flux, which is generally a major advantage for resonant DC/DC converters.

These n converter modules are generally connected in series on the primary side between the connections 12, 13 of the high-voltage DC distribution network, and are generally connected in parallel on the second side between the connections 11 of the further DC network. Since the voltage of this further DC network is, however, too high for the semiconductor switches in a single converter module, two converter modules are in each case connected in series first on the secondary side, as is shown in FIG. 1.

As can easily be seen, the proposed module concept allows the high-voltage DC/DC converter 10 to be matched to the specified voltage of the high-voltage DC distribution network 1 in a very simple and universal manner, that is to say the number of converter modules which need to be connected in series is governed by the voltage of the high-voltage DC distribution network 1. If, for example, the voltage of the high-voltage DC distribution network 1 is 70 kV, then 28 primary-side converter modules have to be provided in series, assuming a semiconductor switch is configured for a withstand voltage of 2.5 kV.

Figure 2:
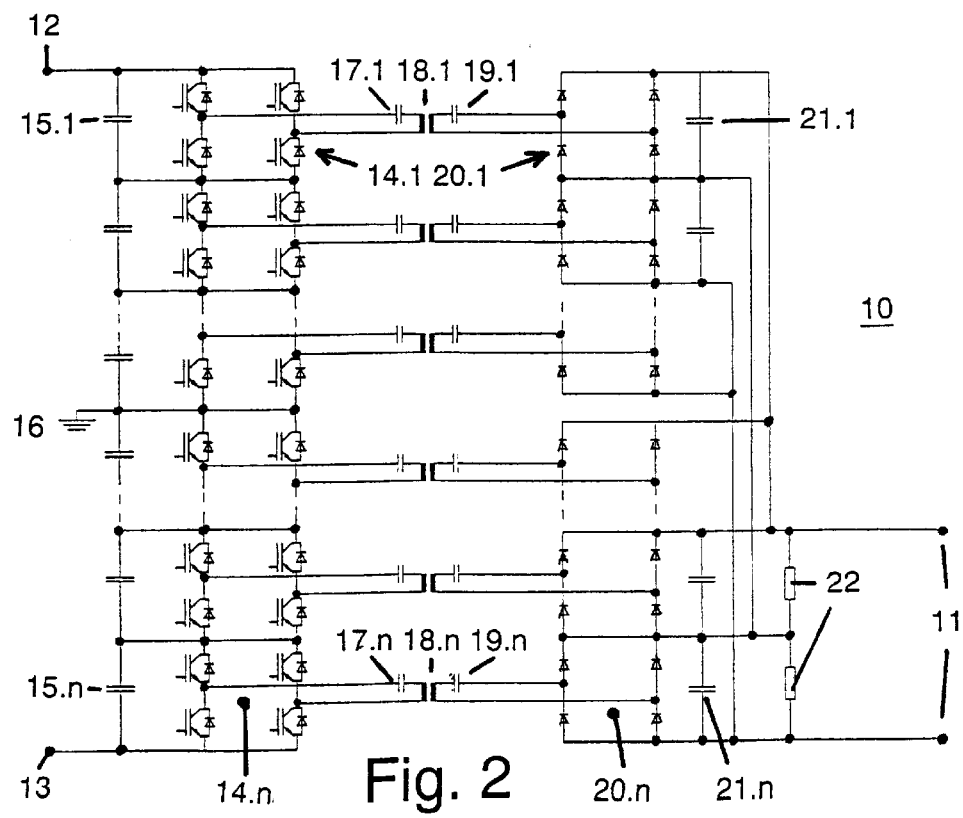
FIG. 2 is a schematic diagram of a simplified version of the high-voltage DC/DC converter for an energy flow from a high-voltage side to a medium-voltage side.

FIG. 2 shows a simplified version of the high-voltage DC/DC converter 10, which allows energy or current to flow only from the high-voltage DC distribution network 1 to the connections 11 (from the high-voltage side to the medium-voltage side). In this simplified version, which is suitable for feeding a medium-voltage DC distribution network, the converter bridges 20.1 to 20.n are fitted with diodes in each of the four bridge arms. The rest of the circuit is the same as that in the embodiment in FIG. 1.

Figure 3:
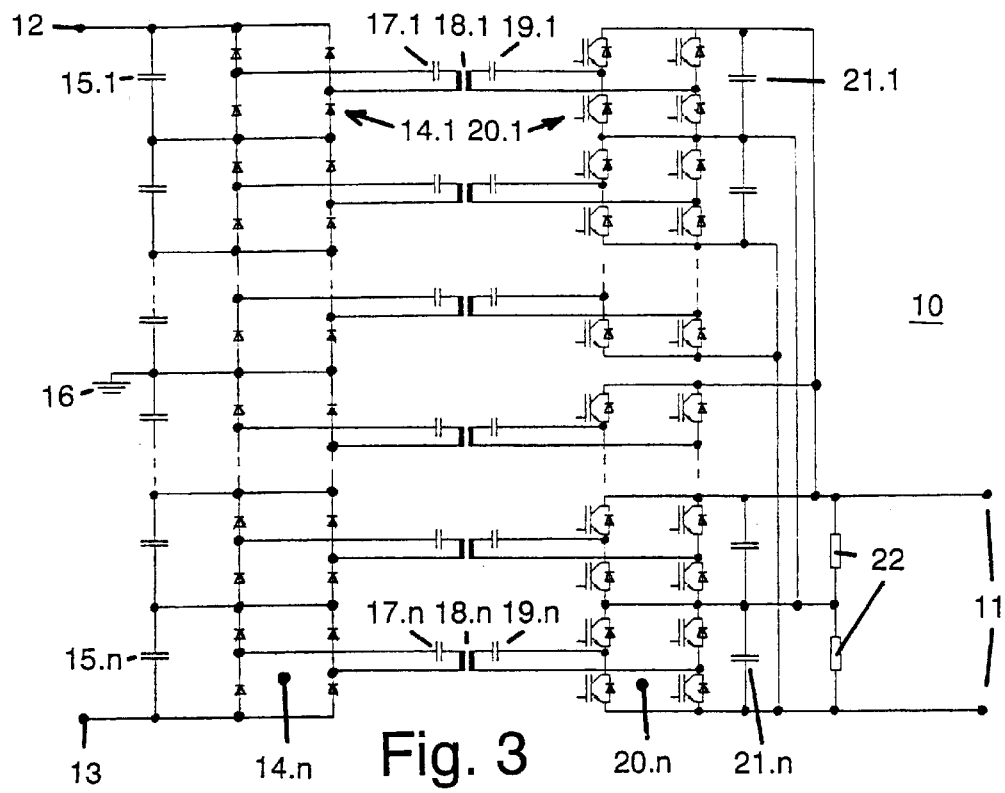
FIG. 3 is a schematic diagram of a simplified version of the high-voltage DC/DC converter for an energy flow from the medium-voltage side to the high-voltage side.

FIG. 3 shows a simplified version of the high-voltage DC/DC converter 10, which allows energy or current to flow only from the connections 11 to the high-voltage DC distribution network 1 (from the medium-voltage side to the high-voltage side). In this simplified version, which is suitable for feeding from a medium-voltage DC distribution network or for feeding from a medium-voltage power source—for example relatively large wind-driven power stations or solar power stations—the converter bridges 14.1 to 14.n are fitted with diodes in each of the four bridge arms. The rest of the circuit is the same as that in the embodiment in FIG. 1.

Figure 4:
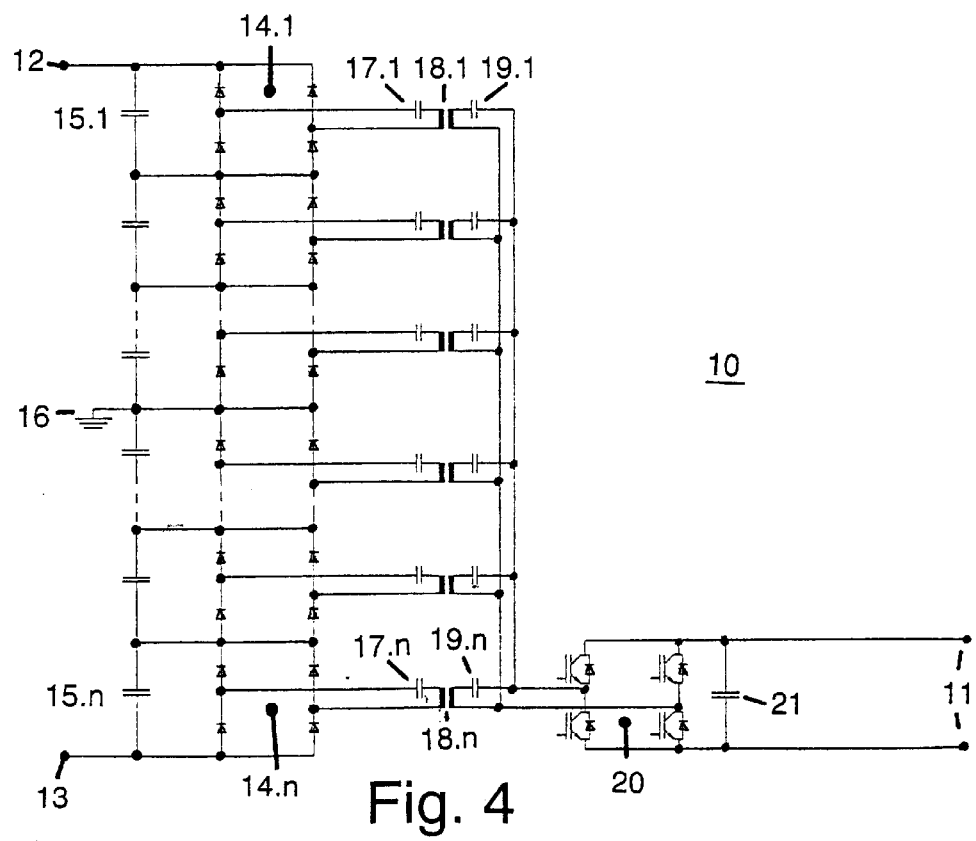
FIG. 4 is a schematic diagram of a simplified version of the high-voltage DC/DC converter for the energy flow from the medium-voltage side to the high-voltage side, with relatively low rating requirements.

FIG. 4 shows a simplified version of the high-voltage DC/DC converter 10, which allows energy or current to flow only from the connections 11 to the high-voltage DC distribution network 1 (from the medium-voltage side to the high-voltage side) for relatively low rating requirements. In this simplified version, which is suitable for feeding from a medium-voltage DC distribution network or for feeding from a medium-voltage power source—for example relatively small wind-driven power stations or solar power stations—, the converter bridges 14.1 to 14.n are fitted with diodes in each of the four bridge arms. All the secondary coils of the transformers 18.1 to 18.n are connected in parallel to the AC connections of a single converter bridge 20, with the connections being made via resonant capacitors 19.1 to 19.n. The DC connections of the converter bridge 20 form the connections 11 between which a capacitor 21 is disposed. The converter bridge 20 is fitted with semiconductor switches which can be switched on and off actively, such as IGBTS, GTOs, MOSFETs, in the four bridge arms. The rest of the circuit is the same as that in the embodiment in FIG. 1.

I claim:

1. A high-voltage DC/DC converter, comprising:

a number of primary-side converter modules having DC connections, said DC connections of said primary-side converter modules connected in series between connections of a high-voltage DC distribution network, each of said primary-side converter modules having a primary-side converter bridge, a primary-side capacitor connected to said primary-side converter bridge, a primary-side series resonant capacitor connected to said primary-side converter bridge, a transformer connected to said primary-side series resonant capacitor and to said primary-side converter bridge, and a secondary-side series resonant capacitor connected to said transformer; and at least one secondary-side converter module having DC connections, said DC connections of said secondary-side converter modules connected in parallel between connections of a further DC network, said secondary-side converter module having a secondary-side converter bridge and a secondary-side capacitor connected to said secondary-side converter bridge.

2. The high-voltage DC/DC converter according to claim 1, wherein both said primary-side converter bridge and said secondary-side converter bridge have semiconductor switches which can be switched on and off actively.

3. The high-voltage DC/DC converter according to claim 1, wherein said primary-side converter bridge has a semiconductor switch which can be switched on and off actively, and said secondary-side converter bridge is formed of diodes.

4. The high-voltage DC/DC converter according to claim 1, wherein said primary-side converter bridge is formed of diodes, and said secondary-side converter bridge includes semiconductor switches which can be switched on and off actively.

* * * * *